June 14, 1960  B. BERG ET AL  2,940,373
MOUNTING AND OPERATING MEANS FOR ZOOM LENSES
FOR TELEVISION AND MOTION PICTURE CAMERAS
Filed May 6, 1958  2 Sheets-Sheet 1
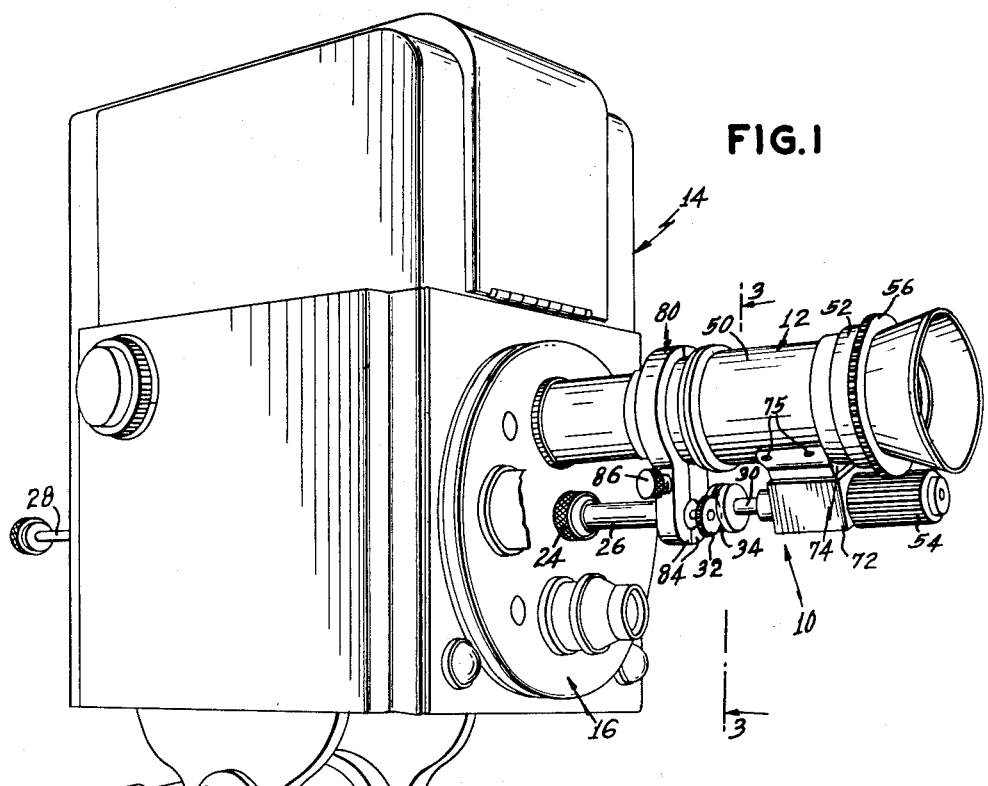
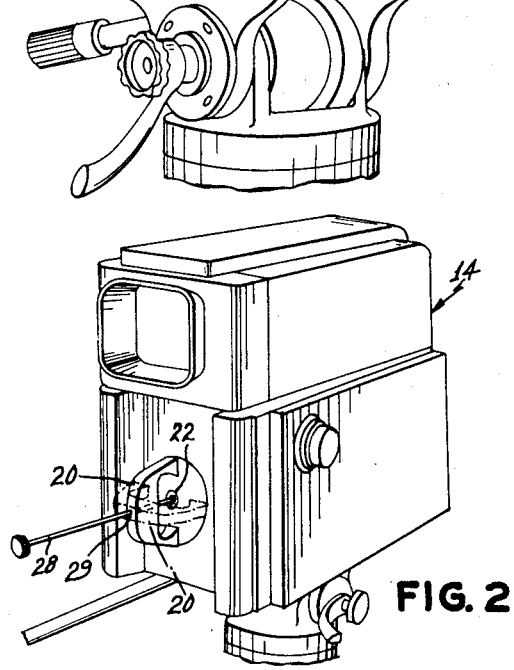
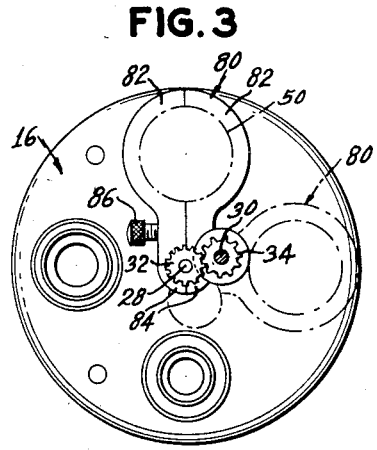
INVENTORS
Benjamin Berg
Wayne D. Clegg
BY Melvin William Smith
ATTORNEYS INVENTORS
Benjamin Berg
Wayne D. Clegg
BY Melvin William Smith

ATTORNEYS

United States Patent Office 2,940,373
Patented June 14, 1960

2,940,373
MOUNTING AND OPERATING MEANS FOR ZOOM LENSES FOR TELEVISION AND MOTION PICTURE CAMERAS

Benjamin Berg, Los Angeles, Wayne D. Clegg, Tujunga, and Melvin William Smith, Alta Loma, Calif.; said Clegg and said Smith assignors to said Berg Filed May 6, 1958, Ser. No. 733,442

6 Claims. (Cl. 95—45)

The present invention relates to varifocal lenses commonly known as zoom lenses and more particularly to means for mounting such lenses on a television or motion picture camera and to means operable at the back of the camera for the zoom operation and also for adjusting a normally stationary front lens component for focusing the latter.

In zoom or varifocal lenses of the type for which the present invention is particularly well adapted, the zoom operation is performed by moving two lenses, which are in fixed spaced relation, as a unit in relation to an intermediate stationary lens, a normally stationary front lens is provided for focusing purposes, and a stationary relay lens is also provided, all as shown and described in United States Patent No. 2,778,272, issued January 2, 1957. In the commercial form of such lenses, which are sold under the trademark "Pan Cinor," the zoom group of lenses, consisting of said two movable lenses, carried by a common lens mount, and the intermediate lens, are mounted in a lens barrel which has a longitudinal slot therein and a pivoted lever is accessible for manual operation externally of the lens barrel and is pivotally mounted on the latter and has a part which projects through said slot and is operatively connected to the common mount for the two movable lenses of the zoom group for moving the latter longitudinally within the lens barrel in relation to the intermediate stationary lens of the zoom group. The front lens which is normally stationary but which is adjustable for focusing purposes is adjustable toward and away from the zoom group longitudinally of the optical axis common to said front lens, said lenses of the zoom group and the relay lens, said focusing adjustment of the lens being accomplished by rotating the mount for said lens in screw-threaded engagement with a part of the barrel.

One object of the present invention is to provide means which is operatively connected to the movable lenses of the zoom group for moving them as a unit longitudinally of the optical axis for the zoom operation, without movement of the front or focusing lens during the zoom operation, unless so desired, and for rotating the front lens for focusing purposes, without moving the movable lenses of the zoom group, unless so desired.

Another object of the present invention is to provide improved means for mounting the zoom lens on the lens turret of the camera and to provide convenient means to enable the zoom lens to be mounted on lens turrets of various cameras.

Another object of the invention is to provide an operation and adjustment unit for zoom lenses adapted to be operatively mounted on a television or motion picture camera with little or no modification of the camera itself.

The above and other objects, features and advantages of this invention will be fully understood from the following description considered in connection with the accompanying drawings which are illustrative of the best mode now contemplated for the practice of this invention.

In the drawings:

Fig. 1 is a perspective view of a television camera provided with a zoom lens unit embodying the present invention, a part of one of the conventional lenses on the lens turret being broken away to more clearly illustrate part of the unit of the present invention;

Fig. 2 is a rear perspective view, on a smaller scale, of the camera illustrated in Fig. 1;

Fig. 3 is a sectional view on the line 3—3 of Fig. 1;

Figure 4:
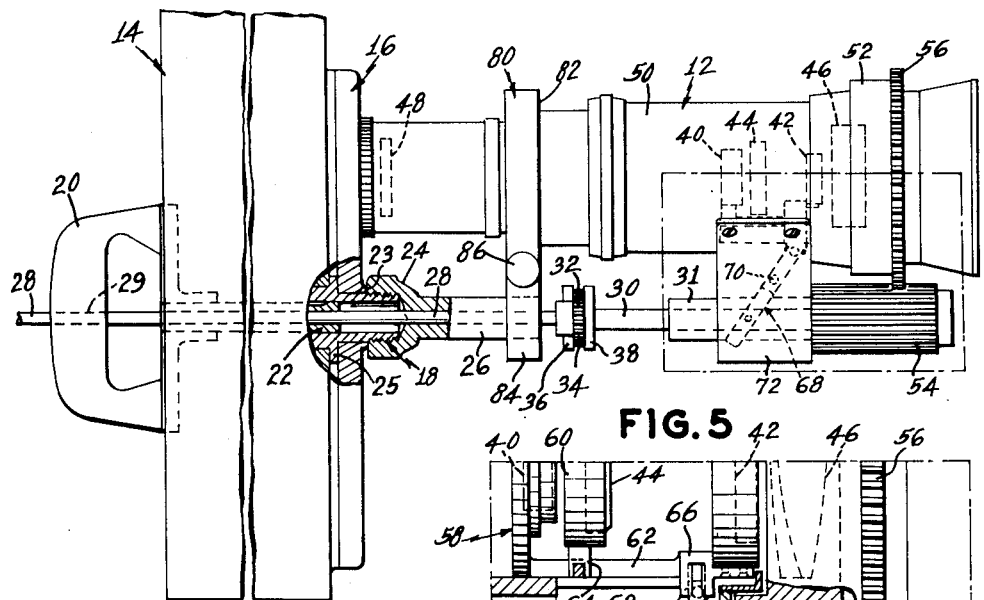
Fig. 4 is a side view in elevation of the camera and zoom lens mounted thereon, the zoom lens and the operation and adjustment unit being shown on a larger scale, and the camera body being more or less schematically illustrated for space saving purposes.

Referring now to the drawings in detail, the zoom lens unit 10 including the zoom lens 12 is shown mounted on a television camera 14. Said television camera is of a well-known type and therefore requires no detailed description except to the extent required to explain the manner in which the unit is mounted on the camera and the manner in which revision is made for operating the zoom lens from a position at the back of the camera. The television camera is provided with a lens turret 16 carrying a group of lenses as is well understood. Said turret is secured to a hollow bearing 18 which is mounted for rotation at the front of the camera housing for rotation about its longitudinal axis and is rotatable by handle 20 which is positioned at the back of the camera and is secured to a hollow tubular rod 22 which is splined to bearing 18 and is mounted for rotation in the camera housing. An internally threaded cap screw 24 removably engages the front of the lens turret at its hub 23 for holding the lens turret 16 in position at the front of the camera against the flange 25 of bearing 18 so that the turret is turned with said bearing when the handle 20 is turned for actuating tubular rod 22. In this respect the camera may be the same as or similar to that disclosed in U.S. Patent No. 2,632,370.

In accordance with the present invention, the cap screw 24 is provided with an integral cylindrical extension 26 which forms a bearing for the forward part of an actuating rod 28 which is movable longitudinally thereof which is also rotatable as will hereinafter more particularly be described. Said rod 28 also has a bearing in tubular member 22 and extends through an opening 29 in handle 20 to a point beyond the latter at the back of the camera, where it can be very conveniently operated by the camera man. Operating rod 28 is operatively connected to a separate actuating rod 30 by means of a gear 32 which is fixed to the outer end of rod 28 and which meshes with a gear 34 fixed to the adjacent end of actuating rod 30 (Figs. 3 and 4). Thus, when rod 28 is rotated this results in rotation of rod 30. Rod 28 is also operable, upon longitudinal movement thereof in either direction to move rod 20 longitudinally in either direction, and for this purpose rod 30 is provided with the axially spaced confronting collars 36 and 38 fixed to said rod and positioned closely at opposite sides, respectively, of gear 34. Thus, gear 32 fits between collars 36 and 38, so that when rod 28 is moved longitudinally actuating rod 30 is similarly moved without lost motion by reason of the position of gear 32 between said collars.

Figure 5:
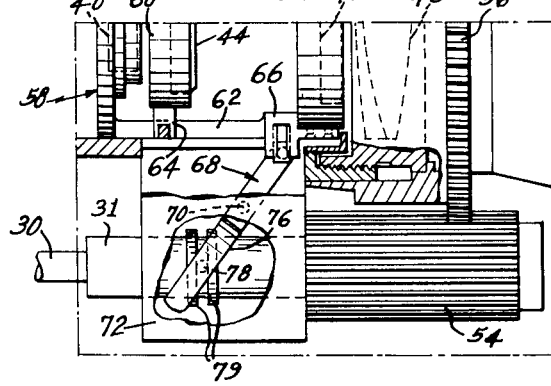
Fig. 5 is a view on a larger scale of the area of Fig. 4 outlined by the dot and dash lines.
Figure 6:
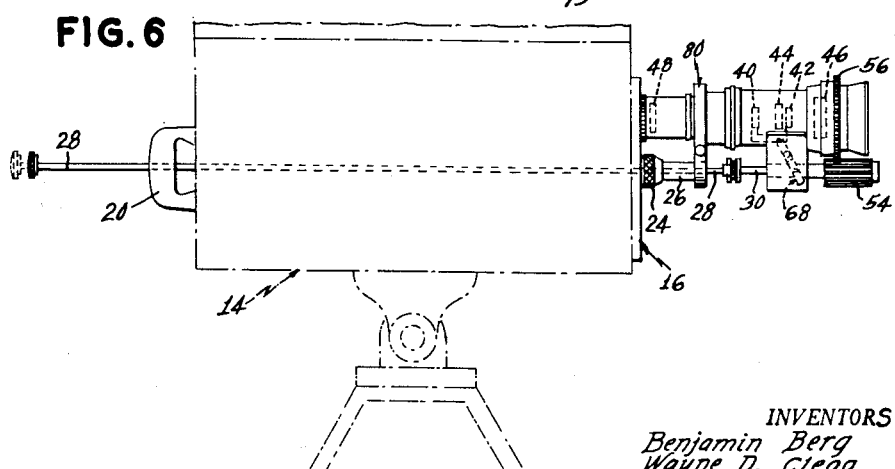
Fig. 6 is a view, on a smaller scale, showing the position of the lenses of the zoom group different from the position illustrated in Fig. 4.

As is well understood, the zoom or varifocal lens 12 is provided with a pair of movable lenses 40 and 42 which are movable as a unit, in fixed spaced relation, in relation to an intermediate stationary lens 44. These three lenses constitute the zoom group with which the front or focusing lens 46 and the back or relay lens 48 cooperate as described in the above mentioned Patent No. 2,778,272. The zoom group of lenses and the relay lens are mounted in a lens barrel 50, and the front or focusing lens 46 is carried by a lens mount 52 which is in threaded engagement with the forward end of the lens barrel 50, as illustrated in Fig. 5, so that said front lens can be moved longitudinally toward and away from the front movable lens 42 of the zoom group, for focusing purposes, by a rotary motion of lens mount 52. As here shown rod 28 is operable to rotate lens mount 52 and for that purpose the forward end of the actuating rod 30 is provided with a gear 54 which meshes with a gear 56 fixed to the lens mount 52. It will be observed that gear 54 is considerably wider than gear 56 so that gear 56 remains constantly in mesh with gear 54 during the longitudinal movement of actuating rod 30 by rotating rod 28 when the latter is moved longitudinally for performing the zoom operation.

The movable lenses 40 and 42 of the zoom group are mounted in fixed relation in a common lens mount 58 which is movable longitudinally of the lens barrel in two directions in relation to the stationary mount 60 in which the intermediate lens 44 is held. Mount 58 is held against rotation in the lens barrel 50 in any suitable way and mount 60 is held in stationary position in said lens barrel in any suitable way. As illustrated in Fig. 5, the lens mount 58 is provided with a slotted longitudinal part 62 through which the part 64 of the stationary lens mount 44 projects and which, for convenience of illustration only, may be considered as the means for preventing turning movement of lens mount 58. The slotted part 62 is provided with a forked element 66 in which the upper end of an actuating lever 68 is received. Said actuating lever is pivotally mounted as indicated at 70 in a housing member 72 secured to the lens barrel 50 in any usual way as by a yoke member 74 screwed at its upper end to said lens barrel as indicated at 75. The arm 76 of actuating lever 68 is preferably forked at its free end which is positioned within housing 72 as indicated at 78 in Fig. 5 between collars 79 on the enlarged part 31 of said rod so that the rod can turn in relation to the forked end of lever 68.

Thus, in view of the above description it will be readily apparent that operating rod 28 when moved longitudinally is operable to move the zoom lenses 40 and 42 as a unit in relation to the intermediate stationary lens 44 of the zoom group and that this operation can be readily and conveniently accomplished by the camera man at the back of the camera, and further it will be observed that the front lens 46 need not be moved during the zoom operation, unless so desired, since longitudinal movement of rod 28 is ineffective to move the front lens 46. On the other hand, operating rod 28 is rotatable for rotating actuating rod 30 and gears 54 and 56 for rotating lens mount 52 to thereby move the front lens 46 in either direction, according to the direction of rotation of rod 28, for focusing purposes.

Referring now further to the manner in which the zoom lens is supported at the front of the camera, it will be observed first that the rear part of the lens barrel 50 is removably attached in the usual way in one of the openings of the lens turret 16 from which one of the conventional camera lenses may be removed or for which the lens socket is purposely provided, as may be desired. In order to provide a firm support for the zoom lens on the turret 16 without reliance merely upon the engagement of the lens barrel in the lens socket of the turret, provision is made in accordance with the present invention for supporting the zoom lens at one or more points spaced outwardly from the lens turret. For this purpose there is provided a supporting member 80 which comprises the companion parts 82 which conform in size and shape to the part of the barrel 50 which projects through said support 80. Parts 82 have integral portions 84 which are releasably clamped on cylindrical extension 26 of the cap screw 24 by a clamping screw 86 which is threaded into said parts for tightening parts 84 on cap screw extension 26 as will be readily understood. It is to be noted that zoom lenses of different diametrical dimensions may be readily mounted by the mounting means of the present invention and also that the present invention enables the mounting and adjustment unit to be associated on cameras in which the lens mounts of the turret are at different distances from the rotary axis of the turret, in different cameras respectively. More particularly it will be noted, that the support device 80 is of such construction that it may be provided in various sizes to fit various zoom lens barrels and to be attachable releasably both to the zoom lens barrel and to the cap screw extension 26. Also, since the actuating rod 30 is laterally off-set from the operating rod 28 where the gears 32 and 34 mesh, the zoom lens barrel 50 can be readily engaged with and disengaged from the driving gear 32 by turning the lens barrel 50 about its own axis while in the turret socket, before support 80 is applied to or tightened on said lens barrel, to compensate for variations in distances between the axis of rotation of the turret and the lens socket of the turret.

While we have shown and described the presently preferred embodiment of our invention, it will be understood that the invention may be embodied otherwise than as herein specifically described and illustrated and that in the embodiment herein disclosed certain changes in the details of construction and in the arrangement of parts may be made without departing from the underlying idea or principles of this invention within the scope of the appended claims.

Having thus described our invention, what we claim and desire to secure by Letters Patent is:

1. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod.

2. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod, a tubular member releasably securing said turret to the forward end of said shaft and extending forwardly of said turret coaxially of said shaft, means extending radially of said tubular member and connected thereto and to the lens to prevent tilting of the turret under the weight of the lens, said rod being movable longitudinally of said tubular member for actuating said lens for the zoom operation.

3. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod, said zoom lens having a front focussing lens which is normally stationary and which is rotatable for focussing, and said rod being rotatable in said shaft and having an operative connection with said front lens for effecting the focussing operation.

4. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod, said zoom lens having a front focussing lens which is normally stationary and which is rotatable for focussing, and said rod being rotatable in said shaft and having an operative connection with said front lens for effecting the focussing operation, said last mentioned connection comprising a rotatable shaft disposed laterally of said rod and a gear thereon and a gear on said rod engageable with said first mentioned gear, said gears being engageable with and disengageable from each other by relative lateral movement of said rod and said last mentioned shaft.

5. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod, said actuating part comprising a rod provided with axially spaced members forming the releasable interengaging means of said actuating part, and said releasable interengaging means of said rod being disposed in the space between said axially spaced members of said actuating part for moving said actuating part longitudinally in opposite directions when said rod is moved longitudinally in corresponding opposite directions, respectively.

6. In combination, a camera having a rotary lens turret, a zoom lens and operating means therefor, said zoom lens having a plurality of lens elements which are relatively movable longitudinally of the optical axis for the zoom operation, a hollow rotary shaft extending from the back of the camera to the front of the camera, said turret being secured to said shaft at the front of the camera and said zoom lens being mountable on said turret, said shaft being accessible at the back of the camera for rotating said turret to move the zoom lens to operative position, a rod extending through said tubular shaft from the back of the camera to the front of the camera and movable longitudinally coaxially of said shaft, and means operatively connecting said rod at the front of said turret to the zoom lens for actuating said lens for the zoom operation thereof, said rod being accessible at the back of the camera for effecting said longitudinal movement thereof, said means which operatively connects said rod to the zoom lens comprising an actuating part carried by said lens and disposed laterally of the axis of said rod and releasable interengaging means on said actuating part and on said rod, said zoom lens having a front focussing lens which is normally stationary and which is rotatable for focussing, and said rod being rotatable in said shaft and having an operative connection with said front lens for effecting the focussing operation, said last mentioned connection comprising a rotatable shaft disposed laterally of said rod and a gear thereon and a gear on said rod engageable with said first mentioned gear, said gears being engageable with and disengageable from each other by relative lateral movement of said rod and said last mentioned shaft, said rotatable shaft having a pair of axially spaced members between which said first mentioned gear is located and which are engageable by the gear on said rod for moving said shaft longitudinally in opposite directions when said rod is moved longitudinally in corresponding opposite directions, respectively.

References Cited in the file of this patent

UNITED STATES PATENTS

| 2,523,067 | Sherry | Sept. 19, 1950 |
| 2,566,889 | Hopkins | Sept. 4, 1951 |
| 2,632,370 | Shepard | Mar. 24, 1953 |
| 2,663,223 | Hopkins | Dec. 22, 1953 |
| 2,732,763 | Back et al. | Jan. 31, 1956 |
| 2,797,618 | Bloomberg et al. | July 2, 1957 |
| 2,885,937 | Donnay | May 12, 1959 |

FOREIGN PATENTS

| 531,524 | France | Jan. 16, 1922 |
| 1,082,803 | France | Jan. 3, 1955 |